Jan. 11, 1927.

C. A. MYERS 1,614,433

TENSION APPARATUS FOR CALENDERS

Filed May 12, 1922 — 5 Sheets-Sheet 1

Fig.1.

Inventor
Carmon A. Myers
By
Attorney

Jan. 11, 1927.
C. A. MYERS
1,614,433
TENSION APPARATUS FOR CALENDERS
Filed May 12, 1922
5 Sheets-Sheet 2

Inventor
Carmon A. Myers
By
Attorney

Jan. 11, 1927.

C. A. MYERS

TENSION APPARATUS FOR CALENDERS

Filed May 12, 1922

Inventor
Carmon A. Myers

Inventor
Carmon A. Myers

Jan. 11, 1927.

C. A. MYERS 1,614,433

TENSION APPARATUS FOR CALENDERS

Filed May 12, 1922          5 Sheets-Sheet 5

Inventor
Carmon A. Myers
By
Attorney

Patented Jan. 11, 1927.

1,614,433

UNITED STATES PATENT OFFICE.

CARMON A. MYERS, OF AKRON, OHIO, ASSIGNOR TO THE FIRESTONE TIRE AND RUBBER COMPANY, OF AKRON, OHIO, A CORPORATION OF OHIO.

TENSION APPARATUS FOR CALENDERS.

Application filed May 12, 1922. Serial No. 560,353.

My invention relates to improvements in tension apparatus for use in conjunction with calendering mechanisms, and it is particularly designed for application to calenders of the type that are utilized in the tire manufacturing industry.

In manufacturing tires the fabric, either square woven or cord, of which the tire casings are constructed, is usually impregnated with rubber. One method of accomplishing this impregnating operation is to run the fabric from a reel through a calender in which a layer or coating of rubber is pressed on or applied to the fabric. Difficulties arise during the operation, in imposing a proper tension upon the fabric while it is being operated upon by the calender rolls. In impregnating cord fabric these difficulties are accentuated by the fact that it does not include a weft thread but merely an easily broken tie thread that serves, under ordinary conditions, to hold the warp cords in parallel relation. The cords of such fabric are, therefore, more easily distorted unless a uniform tension is exerted throughout the entire width of the fabric. If such fabric is fed to the calender rolls in such manner that the cords thereof are not held under tension, and in their normal spaced relation, throughout the zone immediately preceding that zone that is being compressed between the calender rolls, the cords will be unequally stretched, just prior to their passage through the calender, and then fed between the rolls thereof in such condition. Furthermore, the extreme end portion of the fabric must be subjected to the same uniform tension that is imposed upon the preceding portion of the strip or such end portion will be a total loss. Such loss will amount to a serious disadvantage to manufacturers who produce cord tires in large numbers and therefore utilize a large amount of such fabric.

It is the broad purpose of the present invention to provide a combination of co-operating elements which may be readily attached to a calender of standard construction and whereby the above outlined disadvantages in impregnating fabric may be obviated.

More specifically, the invention is directed toward providing means adapted for operation, in conjunction with the rolls of a calender to exert a uniform tension upon the cords of cord fabric and to maintain such a tension upon the cords when the final end portion of a strip of such fabric is being fed through the rolls of the calender.

Other objects of the invention are to provide a device operable to impose a positive and definite tension upon the strip throughout that zone thereof immediately preceding the portion of the strip that is being gripped by the rolls of the calender and to adapt such devices for adjustment to vary the tension upon the strip as desired.

With these and other objects in view, as will appear as the description proceeds, the invention resides in the combinations and arrangement of elements presently set forth in detail and particularly emphasized in the claims appended hereto.

In the drawings accompanying and forming a part of this specification.

In the preferred practice of my invention, my tensioning apparatus is adapted for use in conjunction with a type of calender that includes a plurality of calender rolls mounted one above the other. Such a calender has been conventionally illustrated in the drawings, wherein 1 designates the calender rolls and 2 upright frame elements which support the calender rolls for rotation one above the other.

My tensioning apparatus, briefly described, comprises a tensioning unit A, through which the fabric is drawn by the action of the calender rolls 1 and prior to its passage therethrough, an auxiliary tensioning unit B, that is mounted for reciprocable adjustment relative to the lowermost roll 1 of the calender and to the tensioning unit A, a driving unit C for actuating the apparatus, and a control unit D, all of which will now be described in detail.

*Tensioning unit A.*

The tensioning unit A comprises a group of preferably three tension rolls designated respectively 3, 4 and 5 that are disposed immediately in front of the lower rolls of the calender. Each roll is mounted for rotation about an axis, parallel with the axis of rotation of the calender rolls, between a pair of laterally spaced brackets 6 which are likewise mounted for rotational movement in such manner that the rolls 3, 4 and 5 may be revolved as a unit about an axis also parallel with the axis of rotation of the calender rolls. Preferably the brackets 6 are keyed upon a cross-shaft 7 that is journaled at each end in one of the frame elements 2 and projects at each end beyond the frame as at 8 for a purpose presently apparent. As shown in Figure 3, the brackets 6 are disposed eccentrically upon the shaft 7 and constructed to provide a mounting for the rolls 3, 4 and 5 whereby in the inoperative position of the tensioning unit A, rolls 3 and 5 are suspended at one side of the axis of rotation of the brackets, while roll 4 is suspended substantially directly below said axis. This arrangement provides for forming a double loop in the fabric, when it is threaded through the tensioning unit, adjacent the calender rolls, by adjusting the tensioning unit to its operative position shown in Figure 2, wherein the roll 4 is above the axis and rolls 3 and 5 on the opposite side of the axis, after the units are rotated in the direction shown by the arrow X, Figure 3.

Rolls 3, 4 and 5 are geared together for driving relation in the following manner: Roll 3, which is driven in the direction of the arrow by means presently described, is provided at one end with a gear wheel 9 that meshes with an idler gear wheel 10. Wheel 10 is substantially the same size as the wheel 9 and is mounted upon one of the brackets 6. The idler gear 10 meshes with a larger gear wheel 11 that is fixed upon one end of the roll 4 whereby roll 4 is rotated by roll 3 at a relatively slower speed. A second idler gear 12 of substantially the same size as the idler gear 10 is mounted upon the aforesaid bracket 6 in mesh with the idler 10 and also in mesh with a gear wheel 13 that is fixed upon the roll 5 and is of larger diameter than gear wheel 11. This arrangement of gearing provides for driving the roll 4 at a reduced speed relative to the speed of driven roll 3, and for driving the roll 5 at a reduced speed relative to that of the roll 4 as will readily be seen.

In the inoperative position of the tensioning apparatus, see Figure 3, the initial course of the fabric is shown, in dotted lines, at 14. The fabric is, preferably, taken from a reel (not shown) and its forward or free end is led under the roll 3, thence over roll 4 to be gripped between the lower rolls 1 of the calender.

Figures 2, 4:
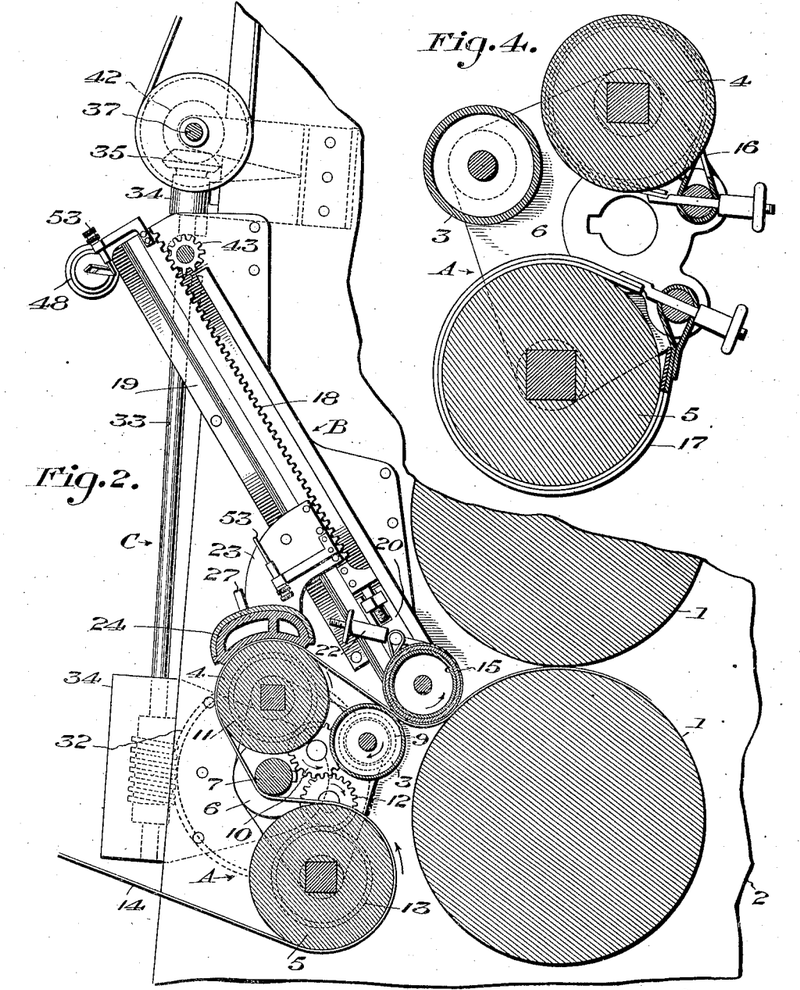
Figure 2 is a vertical central section, on a slightly enlarged scale, of the apparatus shown in Figure 1, parts of the calender being broken away.
Figure 4 is a transverse sectional view of a portion of the tensioning apparatus proper, drawn on a further enlarged scale.
Figures 3, 5:
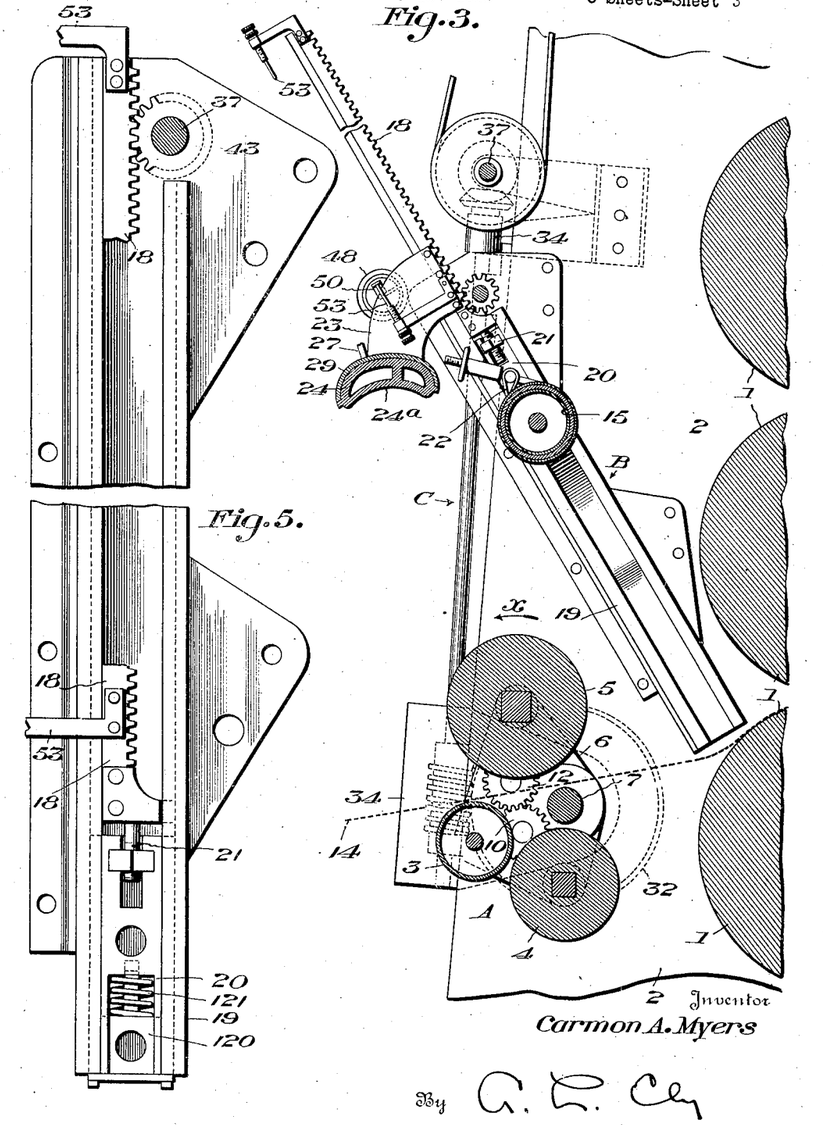
Figure 3 is a view similar to Figure 2 showing the parts in a different position.
Figure 5 is a front elevation, on a still further enlarged scale, of a certain details of the invention presently described.

The tension device is now revolved, by means presently described, in the direction of arrow X to the operative position shown in Figure 2, and a double loop formed in the fabric. In this position the rollers 3, 4 and 5 are practically reversed, and the course of the fabric is under and over roller 5, to form the first loop, thence under and over the roller 4 to form a second reversed loop, and over roller 3 onto the lowermost calender roll 1. In this position of the rolls, roll 3 is placed in driving relation with respect to an auxiliary tension or pressure roll 15 which is adjustably mounted to grip the fabric between its periphery and the roll 3 and to press the strip against the lower roll of the calender just before it is gripped between said calender roll and the one above it. Roll 15 is of approximately the same diameter as the roll 3 and by virtue of its previously described relation with respect to the lower calender roll 1 and the roll 3 serves to drive the latter through rotation of the former, at substantially the same speed as that at which the fabric is fed between the calender rolls. It will now be seen that by means of the previously described driving relation of the rolls 3, 4 and 5, the fabric will be retarded throughout two zones thereof prior to its passage over roll 3, to effect a tension between that portion between the rolls 5 and 4, and also that portion between the rolls 4 and 3. Moreover, owing to the different speeds of rotation of rolls 4 and 5, different tensions will be effected at these two zones. After the extreme end of the fabric has been drawn past the rolls 3, 4 and 5, it will still be tensioned by the action of the roll 15 against the lower calender roll so that this portion of the strip will also be impregnated properly. At this point attention is directed to the relative size of the rolls 3, 4 and 5, which are progressively larger starting with roll 3 for the purpose of facilitating the retarding of the fabric although this feature may be modified as desired. To further facilitate the retarding action of the rolls 4 and 5 and to prevent lost motion, said rolls may be provided respectively with brake bands 16 and 17, such as shown, for instance, in Figure 4.

Auxiliary tensioning device.

Figure 1:
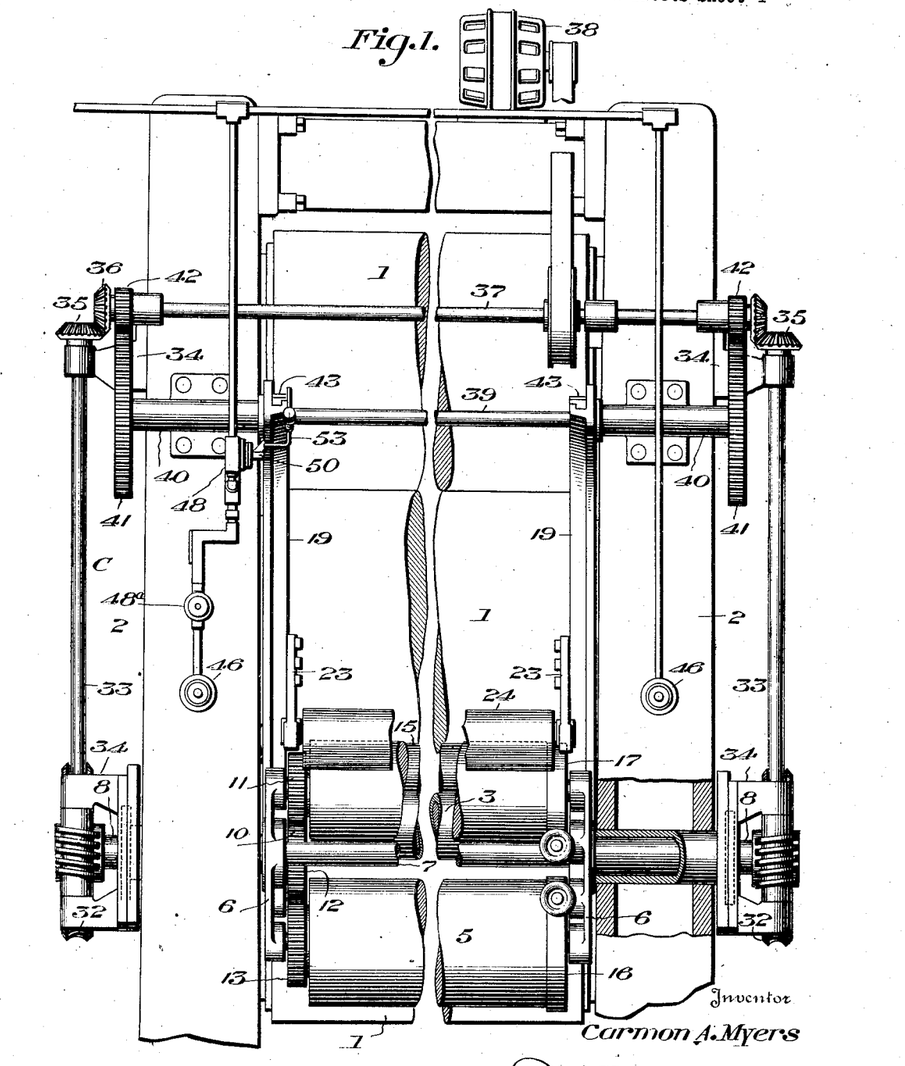
Figure 1 is a front elevation illustrating a portion of a calender equipped with my invention.

The auxiliary tensioing device includes the previously mentioned roll 15, and in addition thereto rack bars 18, which carry the roll 15 and are mounted for reciprocable movement at such an angle relative to the lower calender roll 1 that the roll 15 may be moved toward or away from said calender roll over the top of the revoluble unit that includes the rolls 3, 4 and 5. To this end suitable guides 19 are affixed respectively to each frame element 2, in opposite relation, as shown in Figures 1 and 2, to incline downwardly from the front of the frame elements toward the lower calender roll 1. Each guide 19 carries one rack bar 18 which, at its forward end, is provided with a relatively adjustable block 20. The opposite ends of the roll 15 are journaled respectively in bearings 120 slidably mounted in the lower ends of blocks 20 and cushioned therein by springs 121, whereby each end of the roller may be adjusted relative to its adjacent rack 18 to properly align the roller and to regulate its pressure against the calender roll, the springs 121 allowing a yielding pressure to be exerted on the roll 15. Any suitable form of connection may be utilized between each rack 18 and its block 20 for securing an adjustment such, for instance, as the nut and bolt arrangement shown at 21 in Figure 5. An adjustable brake band 22 may be suitably mounted upon one or both blocks 20, if desired for engagement with the roll 15 to take up wear and prevent lost motion of said roll. At a suitable point upon each rack bar a downwardly extending bracket 23 is secured.

Between the brackets 23 a heating chest is provided for engagement with the upper surface of the fabric as said fabric is drawn over roll 4 so as to heat that side of the fabric upon which the rubber is applied. The heating chest may be of any suitable construction, but it preferably comprises a chambered, elongated casing 24 that is provided with a transversely curved bottom 24ª adapted to conform to the curvature of the roll 4. At each end of the casing a pintle 25 is provided, in offset relation with respect to the longitudinal center of the casing, which are arranged to be journaled respectively in blocks 26 mounted in the lower end of the brackets. A suitable inlet pipe 27 is provided for the casing, whereby steam or hot water may be admitted to the chamber thereof, and a drain opening is also provided therein as at 28. A heat retaining covering of any suitable material may be employed upon the casing if desired as indicated at 29. By means of the offset relation of the pintles 25 relative to the center of the casing 24 and their pivotal mounting in the blocks 26 the casing is suspended for oscillation between the brackets 23 in such position that it is free to adjust itself against the roll 4 when the racks are reciprocated to move the roll 15 into operative and inoperative position. Movement of the casing 24 upon the brackets 23 is limited in one direction by ears 31 upon the forward side of the casing which engage the brackets 23 and act as stops as will readily be understood.

Figure 11:
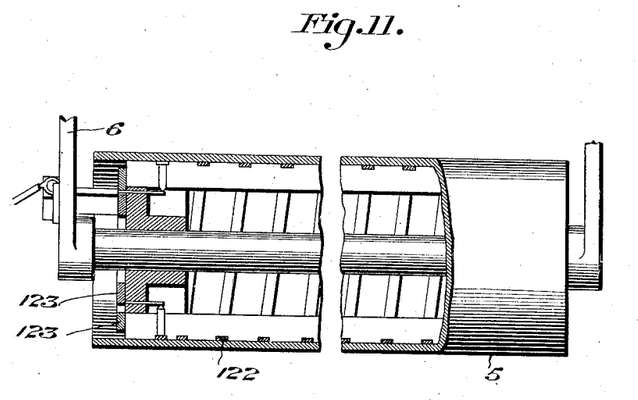
Figure 11 is a view showing another heating means which may be used as a substitute for that shown in Figure 7 or in addition thereto.
Figure 12:
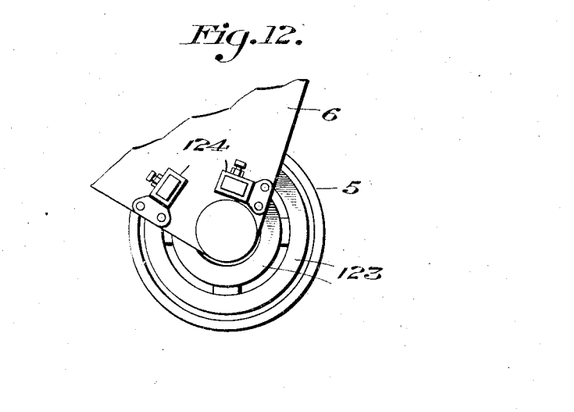
Figure 12 is an end elevation of Figure 11.

In addition to, or as a substitute for the heating chest described, one of the rolls, preferably the roll 5, may be provided with any suitable form of heating device. That shown in Figures 11 and 12 may comprise a coil of heating wire 122 located within the outer surface of the roll 5, the ends of which are connected to collector rings 123, contacted by brushes 124 mounted on one of the brackets 6. In this manner the roll, which contacts the upper side of the fabric, as it passes between the calender rolls, may be heated. Other equivalent devices may be substituted, if desired.

Driving mechanism.

The driving mechanism C comprises coacting elements for simultaneously moving the tensioning unit A and the auxiliary tensioning unit B from the inoperative position shown in Figure 3 to the operative position shown in Figure 2, and vice versa. Briefly described, it includes the following elements:

A worm wheel 32 is affixed to each projecting end 8 of the shaft 7 and is adapted to be driven by an individual worm shaft 33 one of which is mounted, as in brackets 34, upon each frame element 2 in a substantially vertical position. At the upper end of each worm shaft 33 a beveled gear wheel 35 is provided which is driven by a beveled gear 36 upon a rotatable cross-shaft 37. The shaft 37 is mounted in suitable brackets upon the face of the frame elements 2 and is rotated preferably by belt and pulley connection to an electric motor 38. Below the cross-shaft 37 a second cross-shaft 39 is mounted for rotation in suitable bearings 40 affixed upon the frame elements 2. The cross-shaft 39 has affixed at each end thereof a gear wheel 41 which meshes with a corresponding gear 42 that is fixed upon the cross-shaft 37. The shaft 39 extends across from one frame element 2 to the other directly above the upper and rear end of each guide 19. Directly above each guide a gear wheel 43 is keyed upon the shaft 39 in mesh with the teeth of its adjacent rack 18 whereby when said shaft is rotated the racks are moved to adjust the roll 15.

In actual practice the foregoing driving mechanism C is arranged and timed to move the racks 18, and consequently the roll 15, to the upper and rear end of the guides 19 as the tensioning unit A is revolved to inoperative position. Considering its reverse operation, the driving mechanism C is particularly timed to move the roll 15 into engagement with the lower calender roll and the roll 3 as the tensioning unit is moved into operative position, but after said unit has reached the limit of its movement. That is to say the movement of the rolls 3, 4 and 5 into operative position slightly precedes the movement of the roll 15 into driving relation with the roll 3.

*Control unit.*

Figure 6:
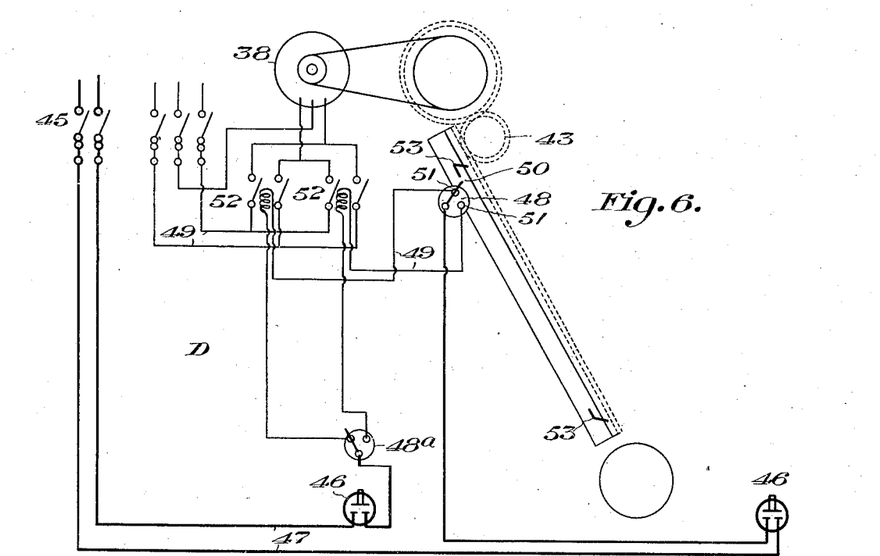
Figure 6 is a diagrammatic view illustrating a system of electrical control utilized in conjunction with my invention.
Figures 7, 8, 9, 10:
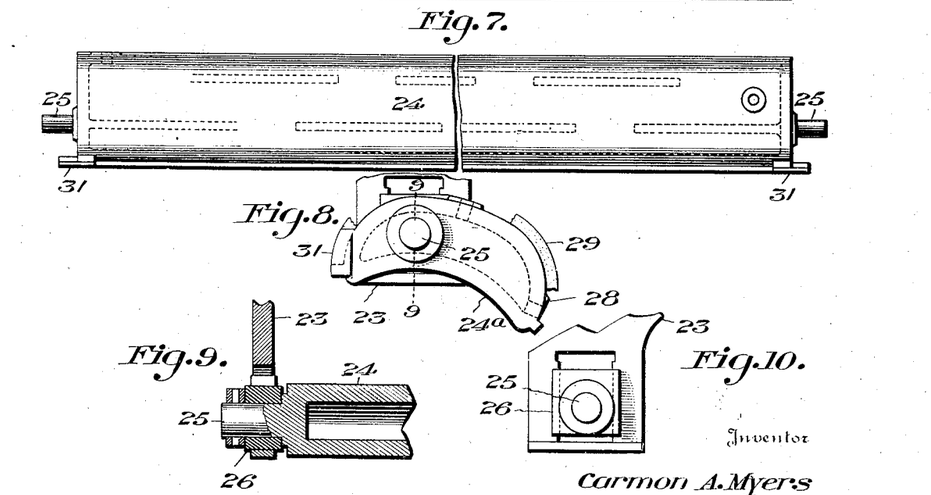
Figure 7 is a bottom plan view of one form of heating device used in conjunction with my tensioning apparatus.
Figure 8 is an elevation of one end of Figure 7 drawn on an enlarged scale with respect thereto and showing a portion of the mounting for the heating device of Figure 7.
Figure 9 is a section taken on the line 9—9 of Figure 8.
Figure 10 is a detail elevation of a portion of the mounting for sustaining the heating device.

As a means of automatically stopping the movement of the unit A and the unit B at the limit of their movement in either direction, I have elected to utilize the following control system best illustrated in Figure 6 of the drawings wherein 45 designates a switch of any suitable character that is connected to a main line circuit or other source of energy not shown. A pair of push button switches 46 are connected to the switch 45 by wires 47 and are mounted respectively upon the frame elements 2 so that each must be operated to close the circuit from the main line. One side of the right-hand switch 46 is wired to one contact of a three way switch 48 whereas one contact of the left-hand switch 46 is connected to a similar switch 48ª. Switches 48 and 48ª are connected in a relay system of circuits 49 of any suitable character arranged to energize the motor 38 from the main line. Switch 48 includes a switch lever 50 arranged to normally engage one of two contacts 51 to establish a circuit from the main line through the relay circuit, and switch 48ª is adapted for operation to control magnetic pole changing switches 52 in the relay circuit whereby the motor 38 may be reversed by the operator. An adjustable actuating element 53 is provided adjacent each end of one of the racks 18 to move therewith and the switch 48 is suitably mounted to present the lever 50 in the path of said actuating element or trip, whereby at the end of each stroke of said racks the switch lever is moved from one contact 51 to the other to break the circuit which operates the motor 38 in one direction and to make a connection through the switch to establish a circuit for reversing the motor. However, the reversing circuit is not completed until switch 48ª has been manually operated to change the polarity of the relay circuit and both switches 46 have been closed as will be apparent without further explanation. From the foregoing it will be seen that the switch 48 is actuated to break a circuit at each end of the stroke of the racks 18 and that the motor 38 cannot again be started until the pole changing switch 48ª is operated and the two push button switches 46 operated in unison to complete the circuit between the relay system of circuits 49 and the main line. Inasmuch as two men are usually employed on a calender, it will be apparent that neither can operate the mechanism of this invention without the aid of the other and thus possibly start the mechanism while the other is in a perilous position relative thereto.

It is believed that the operation of my invention will be clear from the foregoing disclosure and therefore needs no further description herein.

Although the invention has been described in detail and certain descriptive phraseology utilized in setting forth its component parts, it is to be understood that the present disclosure is illustrative in character and is not to be construed as limiting the scope or spirit of the invention unless such limitations are expressly indicated in the claims appended hereto.

What I claim is:

1. The combination with a plurality of calender rolls for gripping and feeding a strip of fabric, of adjustable means for imposing a primary tension upon the strip prior to its passage between the calender rolls, adjustable means for imposing a secondary tension upon the strip between the said first means and the calender rolls, electrically operated driving mechanism for simultaneously adjusting said first and second means, and means for automatically stopping the driving mechanism.

2. The combination with a plurality of calender rolls for gripping and feeding a strip of fabric, of adjustable means for imposing a tension upon the strip prior to its passage between the calender rolls, adjustable means adapted to press the strip against one roll of the calender, driving mechanism for simultaneously adjusting said first and second means, and means for automatically stopping said driving mechanism.

3. The combination with a plurality of calender rolls for gripping and feeding a strip of fabric therebetween, of a tensioning unit adapted for adjustment to form a double loop in the fabric prior to its passage between the calender rolls, an adjustable unit adapted to press the strip against one roll of the calender, and a driving mechanism for simultaneously adjusting said first and second units.

4. The combination with a plurality of calender rolls for gripping and feeding a strip of fabric therebetween, of a tensioning unit adapted for adjustment to form a double loop in the fabric prior to its passage between the calender rolls, an adjustable unit associated with said first unit adapted to tension the strip between the first unit and the calender rolls, and a driving mechanism for simultaneously adjusting said units.

5. The combination with a plurality of calender rolls for gripping and feeding a strip of fabric therebetween, of a tensioning unit adapted for adjustment to form a double loop in the strip prior to its passage between the calender rolls, a unit adapted for adjustment to tension the strip between said first unit and the calender rolls, electrically operated driving mechanism for simultaneously adjusting said units, and means for automatically stopping the driving mechanism.

6. The combination with a plurality of calender rolls for gripping and feeding a strip of fabric therebetween, of a primary tensioning unit adapted for forming a double loop in the strip prior to its passage between the rolls of the calender said unit including a plurality of rotatable elements, and an auxiliary tensioning unit operable to effect a driving relation between one of the calender rolls and one of said rotatable elements.

7. The combination with a plurality of calender rolls for gripping and feeding a strip of fabric therebetween, of an adjustable primary tensioning unit adapted for forming a double loop in the strip prior to its passage between the calender rolls said unit including a plurality of cooperating rotatable elements, an adjustable unit adapted to effect a driving relation between one of the calender rolls and one of said rotatable elements, and means for simultaneously adjusting said first and second units.

8. The combination with a plurality of calender rolls for gripping and feeding a strip of fabric therebetween, of a primary tensioning devise comprising a plurality of rotatable rolls adjustable as a unit about a common axis and adapted for forming a double loop in the strip prior to its passage between the calender rolls, a secondary tensioning device adapted for adjustment to press the strip against one roll of the calender, and driving mechanism for simultaneously adjusting said primary and secondary devices.

9. The combination with a plurality of calender rolls for gripping and feeding a strip of fabric, of a primary tensioning device comprising a plurality of rotatable rolls adjustable as a unit about a common axis and adapted for forming a double loop in the strip prior to its passage between the calender rolls, a secondary tensioning device comprising a rotatable roll adapted for adjustment to effect a driving relation between one calender roll and one roll of said primary device, and driving mechanism for simultaneously adjusting said primary and secondary devices 10. The combination with a plurality of calender rolls for gripping and feeding a strip of fabric, of a primary tensioning device comprising a pluarlity of rotatable rolls adjustable as a unit about a common axis and adapted for forming a double loop in the strip prior to its passage between the calender rolls, a secondary tensioning device adapted for adjustment to press the strip against one roll of the calender and to secure a driving relation between said roll and one roll of said primary device, means for heating the fabric as it passes over one roll of said primary tensioning device, a driving mechanism for simultaneously adjusting said primary and secondary devices, and means for automatically stopping the driving mechanism.

11. In a calender construction, a framework, calender rolls, a group of tension rollers, brackets for supporting the tension rollers, a rotatable mounting for said brackets on the framework. means for revolving the brackets to loop the fabric about the rolls, and a heating element for the fabric.

12. In a calender construction, a framework, calender rolls, a group of tension rollers, brackets for supporting the tension rollers, a rotatable mounting for said brackets on the framework, means for revolving the brackets to loop the fabric, and a pressure roller movable toward and away from the calender roll.

13. In a calender construction, a framework, calender rolls, a plurality of tension rollers, brackets for supporting the tension rollers, a rotatable mounting for said brackets on the framework, a pressure roller movable toward and away from the calender roll, and means for simultaneously revolving the brackets to form a loop in the fabric and moving the pressure roller in contact with one of the calender rolls.

14. In a calender construction, a framework, calender rolls, a plurality of tension rollers, brackets for supporting the tension rollers, a rotatable mounting for said brackets on the framework, a pressure roller movable toward and away from the calender roll, means for simultaneously revolving the brackets to form a loop in the fabric and moving the pressure roller in contact with one of the calender rolls, and a heating device for the fabric.

15. In a calender for rubberizing fabric, a calender roll, a tension device for the fabric. said tension device comprising a tension roller about which the fabric passes, and means for driving said roll at a fixed peripheral speed less than the calender roll.

16. In a calender for rubberizing fabric, a calender roll, a tension device for the fabric, said tension device comprising a tension roller mounted adjacent the calender roll, means for causing the fabric to engage a substantial portion of the periphery of said roller, and means for driving said roller from the calender roll at a fixed speed less than the speed of the calender roll.

17. In a calender for rubberizing fabric, a calender roll, a tension device for the fabric, said tension device comprising a tension roller about which the fabric passes on its way to the calender, and a pressure roller between the calender roller and the tension roller and having driving relation with both of said rollers.

18. In a calender for rubberizing fabric, a calender roll, a tension device for the fabric, said device comprising a plurality of tension rollers about which the fabric is looped on its way to the calender, and a pressure roller movable into driving relation between the calender roll and the tension rollers.

19. In a calender for rubberizing fabric, a calender roll, a group of tension rollers movable relatively to one another to form a loop in the fabric, and a pressure roller movable to establish a driving relation between the calender roller and the tension rollers.

CARMON A. MYERS.